United States Patent Office 3,759,674
Patented Sept. 18, 1973

3,759,674
GELLED ALCOHOLS
Stanley J. Gregg, North Plainfield, N.J., assignor to Allied Chemical Corporation, New York, N.Y.
No Drawing. Filed Mar. 8, 1972, Ser. No. 232,898
Int. Cl. C10l 7/04
U.S. Cl. 44—7 C   9 Claims

ABSTRACT OF THE DISCLOSURE

Dispersions of certain ethylene-acrylic acid copolymers and amine emulsifiers in water form stable gels when admixed with alcohols.

---

This invention relates to gelled alcohols. More particularly, this invention relates to mixtures of particular copolymers of ethylene and acrylic acid and amine emulsifiers which form stable dispersions in water and gel common alcohols.

Gelled alcohols have been known for some years as liquid fuel, but this field has been dominated by nitrocellulose-alcohol products. Gelled fuels have a great advantage over volatile liquid fuels, in that the danger of flashback fire is minimized.

It has now been discovered that dispersions of certain mixtures of ethylene-acrylic acid copolymer waxes, as hereinafter described, and amine emulsifiers form stable emulsions in water, which form stable gels upon admixture with alcohols.

The dispersions of the invention comprise from 10 to 20 parts by weight of an ethylene-acrylic acid copolymer wax having an acid number in the range of about 50 to about 80, preferably from 70 to about 75, and from 3 to 4 parts by weight of an amine emulsifier, i.e., diethylaminoethanol, or morpholine, and sufficient water so that the resulting dispersion contains from about 10 to about 30% by weight of solids. In the preferred compositions of the invention, up to equal parts of the copolymer wax of another inert wax, having a melting point up to about 130° C. is also present.

The ethylene-acrylic acid copolymer waxes useful in the present invention are low molecular weight waxes of ethylene copolymerized with acrylic acid according to the process described in copending application of Knutson et al., Ser. No. 580,196, filed Sept. 19, 1966. The copolymer wax constituent of the present dispersion can be a single copolymer having an acid number within the required range or a mixture of such copolymers having varying acid numbers and an average acid number within the required range.

In addition, conventional waxes can also be added in preparing the dispersions to lower costs. Suitable waxes have melting points up to about 130° C. and include paraffin waxes, generally those having melting points in the range of about 125 to 175° F., microcrystalline waxes, Fisher-Tropf-type waxes, carnauba wax, beeswax and the like. Paraffin waxes are readily available and inexpensive. These waxes can be added in amounts up to the weight of the ethylene-acrylic acid copolymer present.

The present dispersions are prepared by heating the ethylene-acrylic acid copolymer, other waxes if employed and amine emulsifier to a temperature from about 100 to 140° C., preferably about 120 to 125° C., but above the melting point of the wax component and adding the wax mixture to water preheated to a temperature of from 80 to 100° C., preferably 90 to 100° C., while stirring vigorously. The resulting dispersion is then cooled to room temperature to form a stable dispersion. Dispersions containing a high proportion of ethylene-acrylic acid copolymer are quite clear, whereas more translucent dispersions are formed with increasing proportions of other waxes in the mixture.

The resulting dispersions when admixed with common alcohols in amounts so that the final composition contains from 2 to 8, preferably 4 to 5% by weight of solids, form gels on standing.

The alcohols suitable for admixture with the dispersions as hereinabove described include ethanol, propanol, isopropanol, their mixtures, and mixtures of one or more of these alcohols with up to 50% by volume of another alcohol having from 1 to 5 carbon atoms, such as methanol, butanol, pentanol, and the like.

The dispersion described hereinabove can be added to the alcohol, or the alcohol can be added to the dispersion. Addition of the dispersion to the alcohol is preferred.

The resultant gelled alcohols are useful as ashless fuels which burn smoothly and completely, as a base for cosmetics and perfumes, as additives and thickening agents for paints and inks, and as carriers for pharmaceutically active compositions, either alone or in combination with conventional water-miscible carriers.

The invention will be further illustrated by the following examples, but it is to be understood that the invention is not meant to be limited to the details described therein. In the examples, all parts are by weight unless otherwise noted. Gel firmness is rated qualitatively on a scale of from 1.5 or less for a slushy gel up to 4.0. In general, a rating of 3.0 or higher represents a firm, stable gel.

EXAMPLES 1–8

Part A.—Preparation of dispersions

Mixtures of a copolymer of ethylene and acrylic acid having an acid number of 75 and a paraffin wax having a melting point of 150° F. were melted together at about 125° C. and diethylaminoethanol stirred in. The mixture was added to hot water (95–98° C.) and stirred vigorously while the resultant dispersion was cooled to room temperature.

Table I below presents the amounts of the components and clarity data regarding the resultant dispersions.

TABLE I

| Formulation | Examples | | | | | | | |
|---|---|---|---|---|---|---|---|---|
| | 1 | 2 | 3 | 4 | 5 | 6 | 7 | 8 |
| Ethylene-acrylic acid copolymer | 40 | 40 | 30 | 30 | 25 | 25 | 20 | 20 |
| Paraffin | | | 10 | 10 | 15 | 15 | 20 | 20 |
| Diethylaminoethanol | 8 | 6 | 8 | 6 | 8 | 6 | 8 | 6 |
| Water | 152 | 154 | 152 | 154 | 152 | 154 | 152 | 154 |
| Optical density | 0.110 | 0.181 | 0.161 | 0.699 | 0.280 | 1.097 | 1.100 | 1.301 |
| Transmittance, percent | 78 | 66 | 69 | 20 | 53 | 8 | 8 | 5 |

Part B.—Preparation of gelled alcohols

Twenty parts of each of the dispersion as prepared in Part A were added to 80 parts of ethanol and the resultant mixtures allowed to stand. Data regarding gel formation is summarized in Table II below:

TABLE II

| | Examples | | | | | | | |
|---|---|---|---|---|---|---|---|---|
| | 1 | 2 | 3 | 4 | 5 | 6 | 7 | 8 |
| Time to gel, hours | | | 12 | 12 | 12 | 12 | 28 | |
| Gel rating | 1.0 | 1.0 | 3.5 | 3.0 | 3.0 | 4.0 | 2.0 | 2.0 |

Part C.—Preparation of gelled alcohols

The procedure of Part B was repeated except that 80 parts of ethanol were added to 20 parts of each of the dispersions of Part A. The results regarding gel formation are summarized in Table III below:

TABLE III

| | Examples | | | | | | | |
|---|---|---|---|---|---|---|---|---|
| | 1 | 2 | 3 | 4 | 5 | 6 | 7 | 8 |
| Time to gel, hours | | | 3.5 | 6 | 12 | 12 | 28 | 48 |
| Gel rating | 1.0 | 1.0 | 3.0 | 3.0 | 2.5 | 2.5 | 3.0 | 2.0 |

Part D.—Preparation of gelled alcohols

The procedure of Part B was repeated except substituting isopropanol for the ethanol. The results regarding gel formation are summarized in Table IV below:

TABLE IV

| | Examples | | | | | | | |
|---|---|---|---|---|---|---|---|---|
| | 1 | 2 | 3 | 4 | 5 | 6 | 7 | 8 |
| Time to gel, hours | 6 | 12 | 0.7 | 0.5 | 0.4 | 0.4 | 3.5 | 3 |
| Gel rating | 3.5 | 2.0 | 2.0 | 2.0 | 3.0 | 2.0 | 2.0 | 2.0 |

Part E.—Preparation of gelled alcohols

The procedure of Part C was repeated except substituting isopropanol for the ethanol. The results regarding gel formation are summarized in Table V below:

TABLE V

| | Examples | | | | | | | |
|---|---|---|---|---|---|---|---|---|
| | 1 | 2 | 3 | 4 | 5 | 6 | 7 | 8 |
| Time to gel, hours | 0.5 | 2.5 | 0.2 | 5 | 0.5 | 0.5 | 0.5 | 0.5 |
| Gel rating | 2.5 | 2.0 | 2.0 | 2.0 | 2.5 | 2.0 | 2.0 | 2.0 |

I claim:

1. A gelled mixture of a dispersion in water of 10 to 20 parts by weight of an ethylene-acrylic acid copolymer wax having an acid number in the range between about 50 to about 80 and 3 to 4 parts by weight of an amine emulsifier containing from 10 to 30% by weight of solids, and an alcohol having 2 to 3 carbon atoms in an amount such that the mixture contains from 2 to 8% by weight of solids.

2. A mixture according to claim 1 wherein the mixture contains from 4 to 5% by weight of solids.

3. A mixture according to claim 1 wherein the dispersion also contains an additional wax having a melting point up to 130° C. in an amount up to the amount of copolymer wax present.

4. A mixture according to claim 1 wherein the ethylene-acrylic acid copolymer has an acid number of between about 70 and about 75.

5. A mixture according to claim 3 wherein the additional wax is a paraffin wax having a melting point of from 125 to 175° F.

6. A mixture according to claim 5 containing 10 to 15 parts of the copolymer and 5 to 10 parts of the paraffin.

7. A mixture according to claim 6 wherein the alcohol is ethanol.

8. A mixture according to claim 6 wherein the alcohol is isopropanol.

9. A mixture according to claim 1 wherein the dispersion also contains a paraffin wax having a melting point of about 150° F., from 10 to 15 parts of the copolymer, from 5 to 10 parts of the paraffin and contains from 4 to 5% by weight of solids.

References Cited
UNITED STATES PATENTS

| 3,391,081 | 7/1968 | Conrady | 44—7 C |
| 3,148,958 | 9/1964 | Monick | 44—7 A |
| 3,542,531 | 11/1970 | Hiatt et al. | 44—7 D |

BENJAMIN R. PADGETT, Primary Examiner

U.S. Cl. X.R.

44—7 D, E